J. C. POTTER.
MILLING MACHINE.
APPLICATION FILED JUNE 15, 1912.

1,060,705.

Patented May 6, 1913.
6 SHEETS—SHEET 1.

WITNESSES
G. M. Copenhaver
A. P. Hayes

INVENTOR
James C. Potter,
by Chas. J. Williamson
Attorney

J. C. POTTER.
MILLING MACHINE.
APPLICATION FILED JUNE 15, 1912.

1,060,705.

Patented May 6, 1913.
6 SHEETS—SHEET 2.

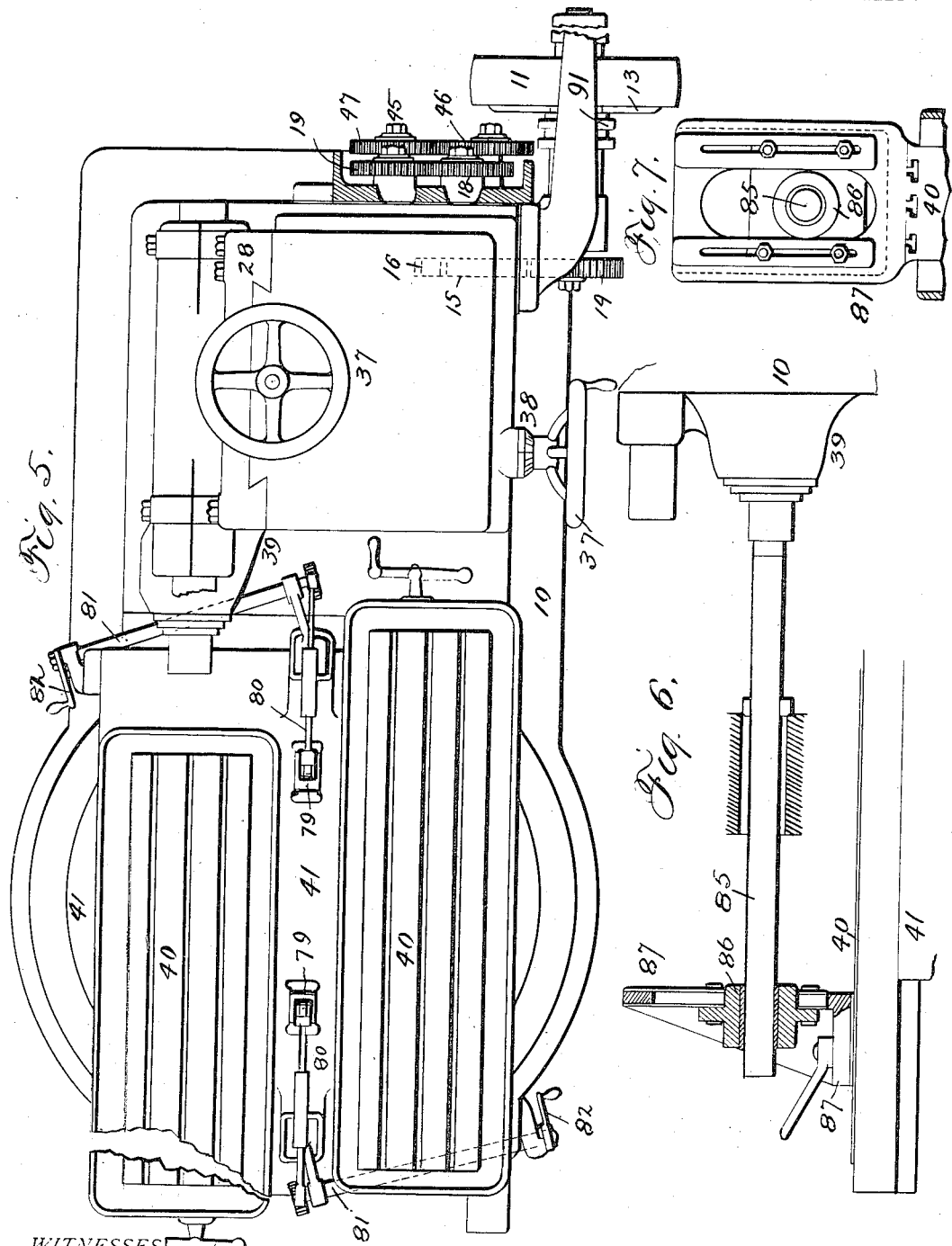

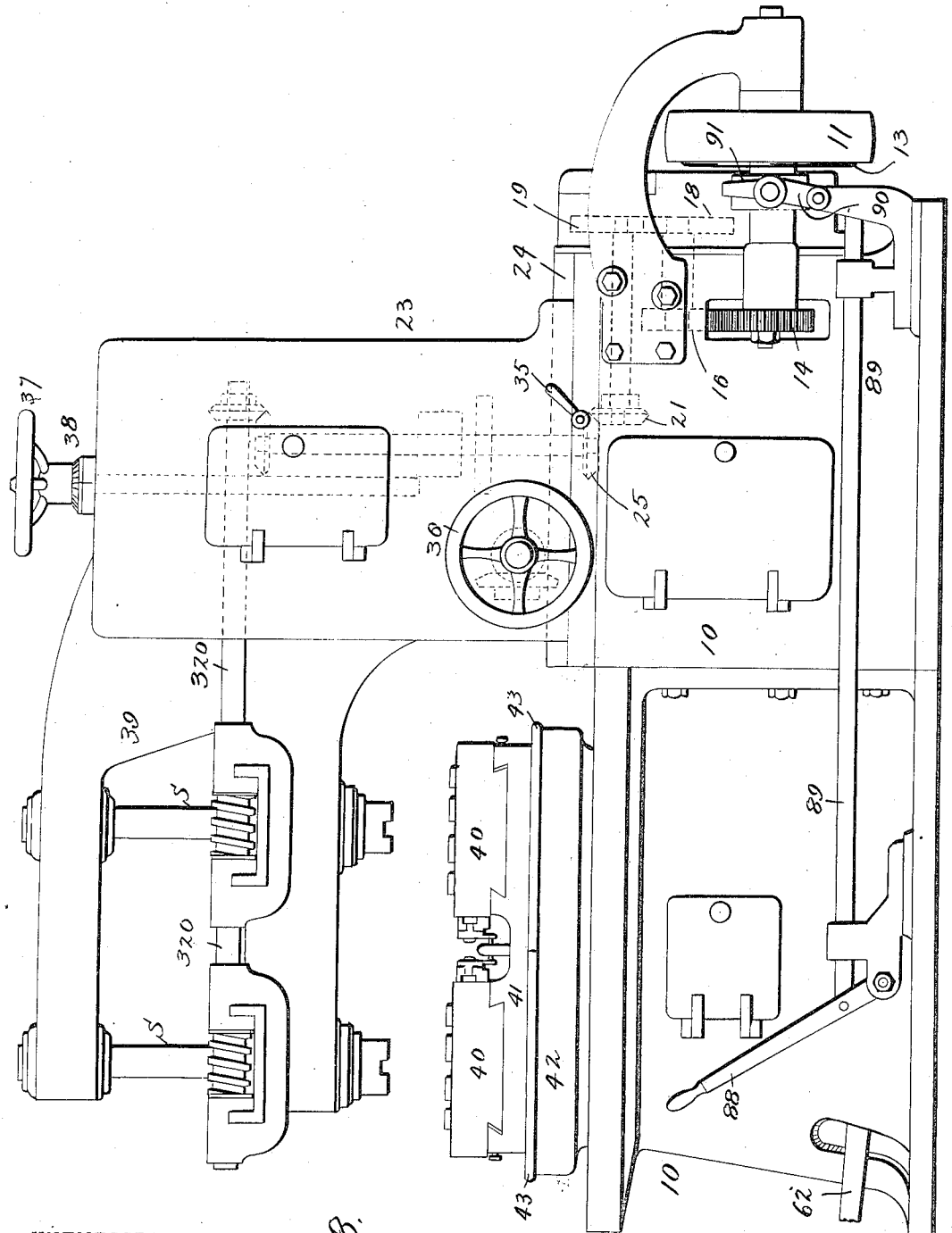

UNITED STATES PATENT OFFICE.

JAMES CHARLES POTTER, OF PAWTUCKET, RHODE ISLAND.

MILLING-MACHINE.

1,060,705.  Specification of Letters Patent.  Patented May 6, 1913.

Application filed June 15, 1912. Serial No. 703,895.

*To all whom it may concern:*

Be it known that I, JAMES C. POTTER, of Pawtucket, in the county of Providence, and in the State of Rhode Island, have invented a certain new and useful Improvement in Milling-Machines, and do hereby declare that the following is a full, clear, and exact description thereof.

The object of my invention is to provide a milling machine free from the deficiencies which inhere in the single table construction, so that the working capacity of the machine will be greatly increased, both in respect of quantity and variety of work done and the manipulation of the machine rendered easier and more convenient and better and safer for the workman. These and other objects of the invention, as will appear, from the embodiments that I have selected for illustration are attained by the milling machine having the characteristics of construction and operation substantially as hereinafter specified and set forth in the claims.

Figure 1:
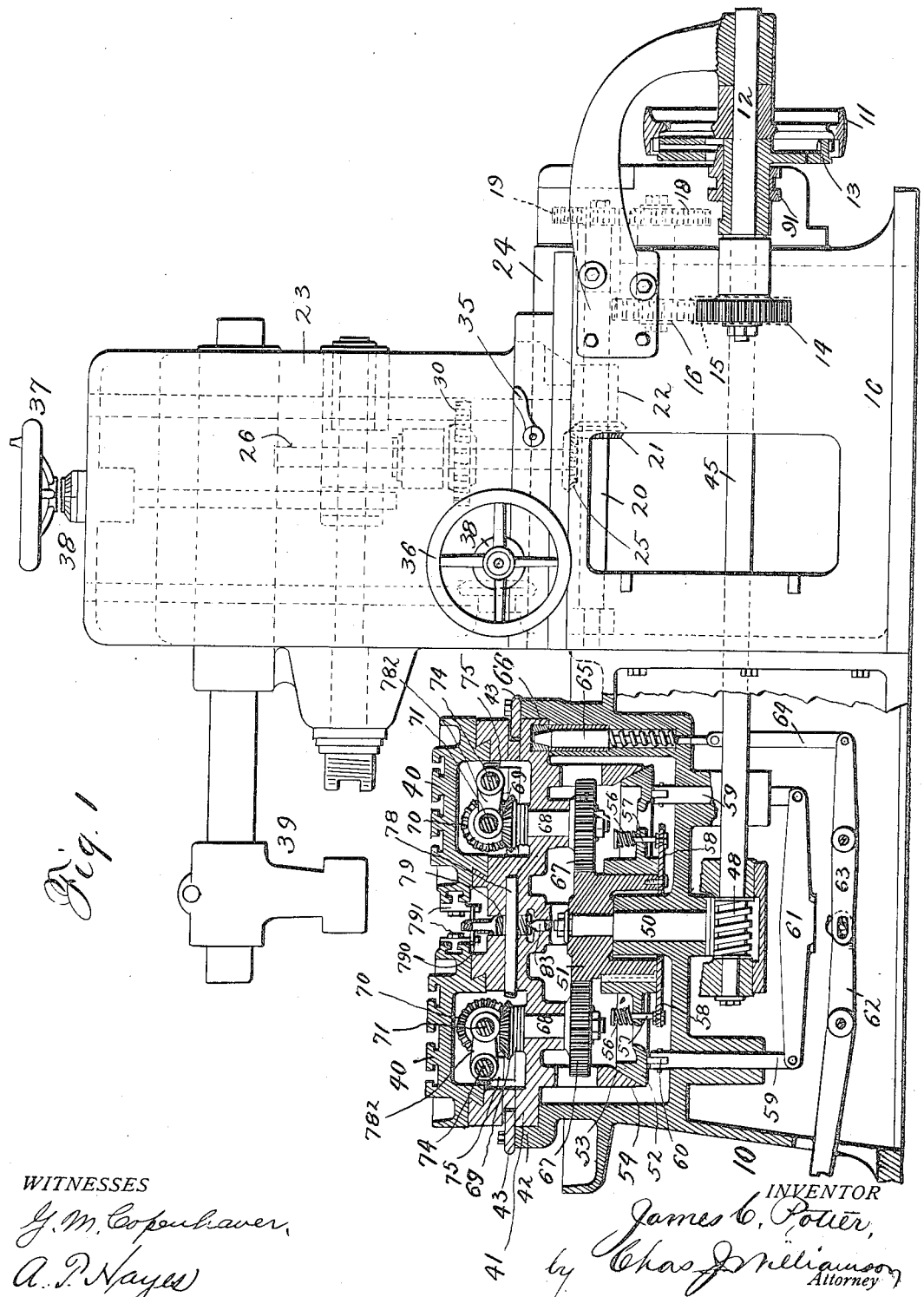
Figure 2:
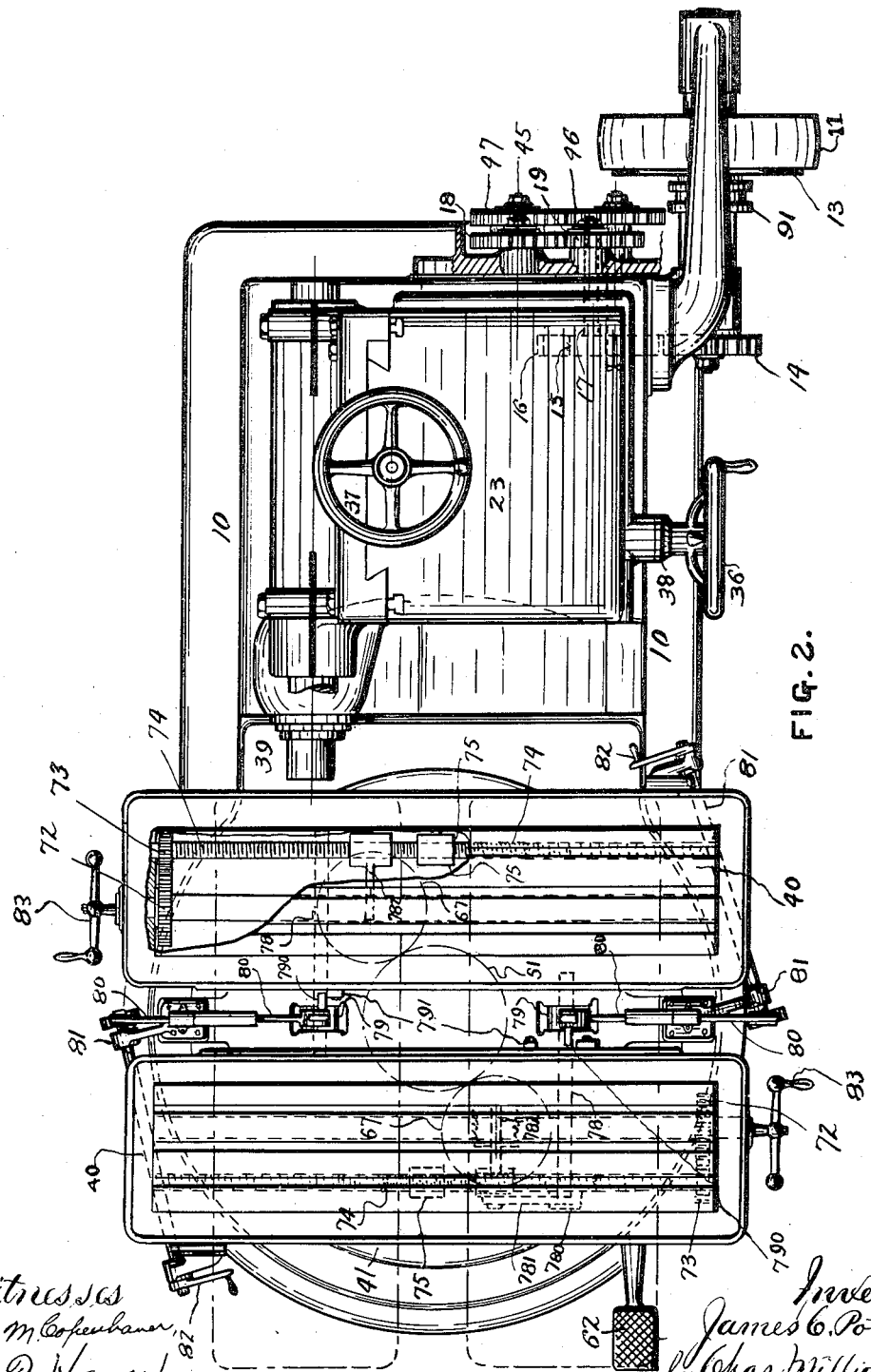
Figure 3:
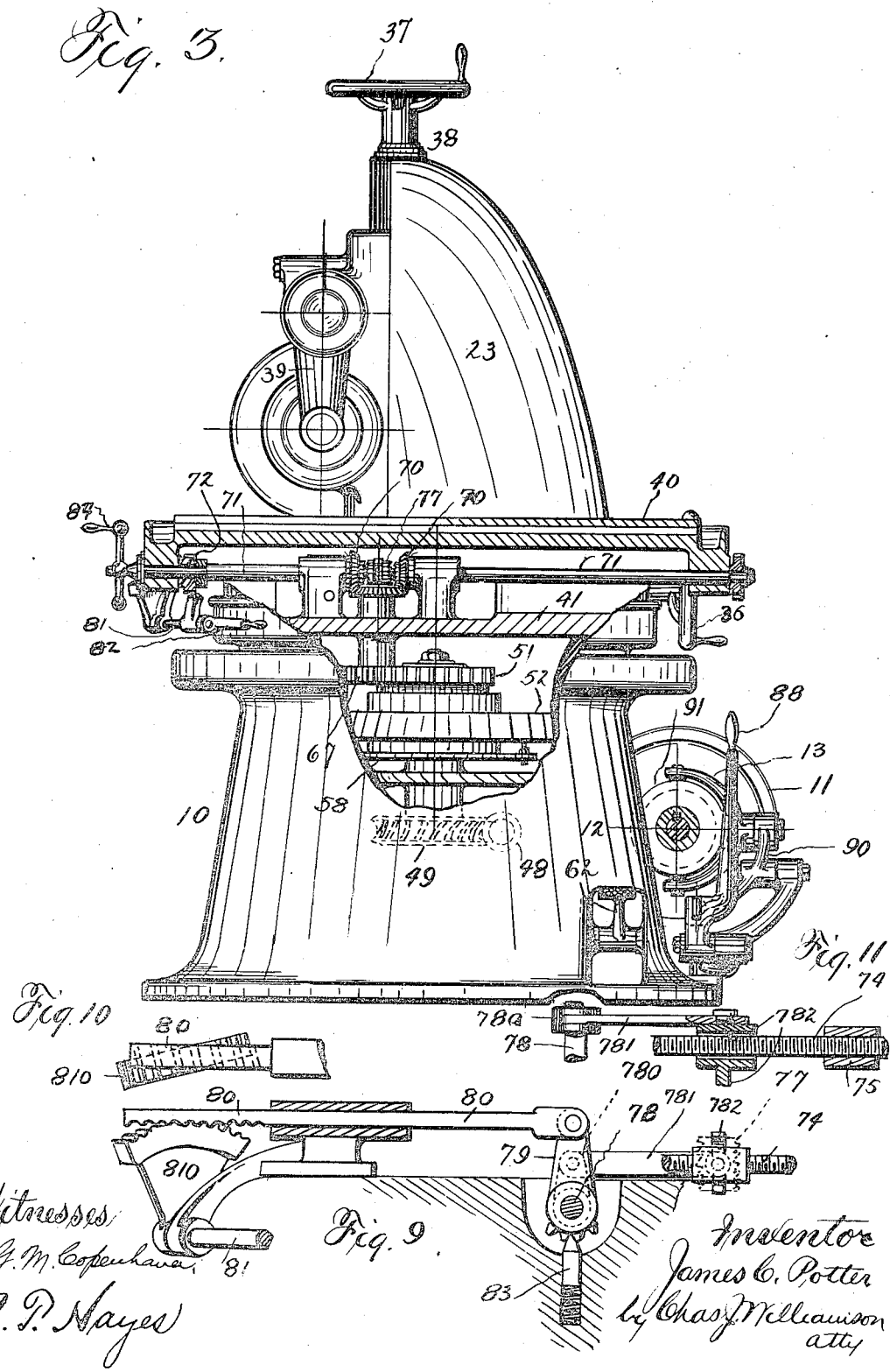
Figure 4:
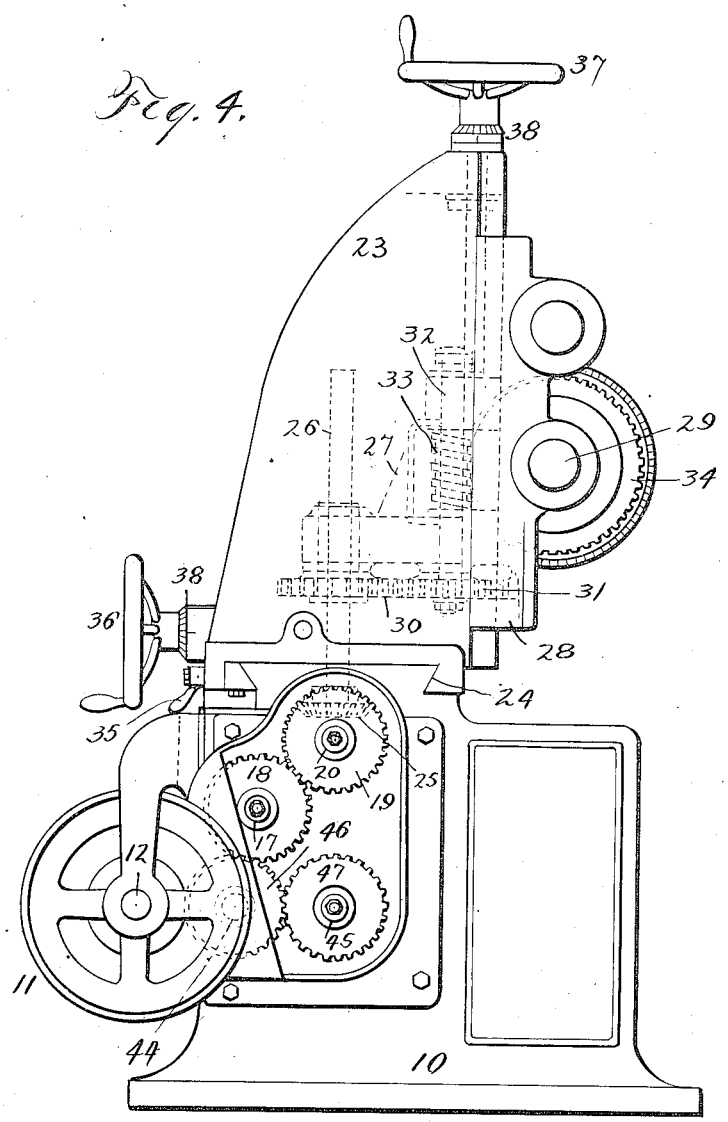

In the accompanying drawings—Figure 1 is a view partly in side elevation and partly in vertical section of a milling machine constructed in accordance with my invention; Fig. 2 is a top plan view thereof; Fig. 3 a front end elevation partly in section; Fig. 4 a rear elevation of said machine; Fig. 5 a top plan view showing the machine adapted for boring; Fig. 6 a detail view in side elevation of a portion of the machine arranged for boring, as shown in Fig. 5; Fig. 7 a detail view in end elevation of the boring bar bearing mounted on the table when the machine is arranged for boring, as shown in Figs. 5 and 6; Fig. 8 a side elevation of a vertical milling machine embodying my invention; and Figs. 9, 10 and 11 are detail views of devices for operating the clutch to control the revolution of the feed screws.

In the embodiment of my invention, illustrated in the drawings, the frame or housing 10, as a matter of convenience, is formed of two castings bolted together upon one of which is mounted the adjustable spindle support, while upon the other or knee is mounted the work holder, all as is described more in detail hereinafter.

Power to run the machine may be applied through a belt pulley 11 loose on a horizontal shaft 12 journaled in bearings on the machine bed or frame, which is run at a constant speed and is adapted by means of a friction clutch 13 to be connected with and disconnected from said shaft. A train of gears 14, 15 and 16 transmit motion from the shaft 12 to a shaft 17, which by means of change gears 18 and 19 transmit motion to a horizontal shaft 20 mounted in bearings, provided near the top of the main frame or housing. Splined to the shaft 20 is a miter gear 21 whose hub is journaled in a bracket 22 on the underside of the spindle support or housing 23, which housing is slidably mounted upon ways 24 upon the upper side of the main frame or housing 10, so that horizontal adjustment of the milling tool with reference to the work may be had and the miter gear 21 is supported so that it may slide along the shaft 20, as may be required. Meshing with the miter gear 21 is a miter gear 25 upon the lower end of a vertical shaft 26, which has bearings in a bracket 27 on the rear side of the vertically movable slide 28, which has bearings for and supports the milling cutter spindle 29, the shaft 26 having such length as to enable the required vertical adjustment of the spindle-carrying slide 28. Keyed to the shaft 26, and slidable along the same to partake of the vertical movements of the spindle slide 28, is a spur gear 30 which meshes with a like gear 31 on the lower end of a worm shaft 32 having a worm 33 which meshes with a worm wheel 34 on the spindle 29, and thereby power is transmitted to the spindle to revolve the same. The gears 30 and 31, and the worm carrying shaft 32, are all supported by the bracket 27, so that they partake of the vertical movements of the spindle slide and of course also of the horizontal movement of the housing or support 23.

A clamping lever 35 is provided to fix the spindle carrying housing or support 23 in the desired position of horizontal adjustment, and clamping bolts are provided to hold the spindle supporting slide 28 in the desired vertical adjustment. The desired horizontal movement in one case and the vertical movement in the other may be conveniently produced by a feed mechanism which in each case includes a screw secured to and revolved by a hand wheel 36 in the case of the horizontal adjustment, and a similar hand wheel 37 in the case of the vertical adjustment, and to enable fine or close adjustments, a dial 38 is provided in each instance. In the case of the horizontal spindle machine, which is shown in Figs. 1 to 7, the usual overhanging arm 39 is provided.

In the embodiments of my invention shown in the drawings there are two similar work tables 40 mounted in a horizontal position upon a swiveled or revoluble support 41 which rests in a circumferential or annular channel 42 in the top of the main frame or housing 10, where it is secured while free to rotate by a divided circular strap 43 bolted to the main frame or housing 10 and projecting into an annular channel or groove in the side of said revoluble support or turret 41.

For revolving the work table turret, I take power from the pulley driving shaft 12 by gearing the shaft 44 on which is mounted the gear 15 of the train which leads from the shaft 12 to the spindle, to a shaft 45 which is geared to the shaft 44 by change gears 46 and 47, respectively, and which shaft 45 has a worm 48 in mesh with a worm wheel 49 on the lower end of the vertical shaft 50 supported in bearings in the main frame or housing 10 concentric with the turret 41. On the upper end of the shaft 50 is keyed a gear wheel 51 to the hub of which is splined a vertically slidable friction cone 52, adapted when lifted, in the manner hereinafter described, to engage a cone friction surface 53 at the lower end of a vertical flange 54 on the turret 41 and thereby the turret be revolved. The friction cone 52 under its weight and the action of a spring device normally tends to drop out of driving engagement with the turret, the spring device being in the form of a coil spring 56 placed around a bolt 57 between the head thereof and the upper side of the friction cone, the bolt passing through a hole in the web of the cone and attached at its lower end to a disk or plate 58 secured to the lower end of the hub of the wheel 51. Preferably there are two spring devices constructed as described, and which may be seen by reference to Fig. 1. Situated vertically beneath the friction cone 52 at diametrically opposite points, are two vertically movable rods 59, each of which at its upper end has an anti-friction roller 60 which has contact with the underside of the friction cone and the two rods at their lower ends are connected by a spanner or yoke 61 in position to be engaged at its midlength by one end of a treadle lever 62, which when pressed at its foot-engaging end lifts the yoke 61 and through it the two rods 59, and thereby forces the friction cone into driving engagement with the friction surface of the turret 41. The treadle 62 is also utilized to unlock the turret preliminary to its rotation, the treadle having a jointed connection with one end of a lever 63, which at its other end is connected by a link 64 with the lower end of a spring-pressed locking bolt 65, whose upper end may be projected into or disengaged from an alining locking hole 66, there being at least two locking holes 66 at diametrically opposite points, since two work tables are employed. When the treadle has been actuated far enough to unlock the turret, the continued movement of the treadle results in the lifting of the yoke 61 and forces the friction cone into driving engagement with the turret. It will be evident that by continuing the treadle in its depressed position the revolution of the turret can be continued; or upon releasing the treadle after the revolution of the turret has commenced, the turret will be automatically stopped after a half revolution and locked, thereby removing one work table from position beneath the milling tool and placing the other work table in such position.

The gear wheel 51 is provided as a means for feeding the work tables by power. For this purpose at diametrically opposite points the gear wheel 51 is in mesh with a gear 67 on the lower end of a vertical shaft 68 which is journaled in bearings in the work table, and upon the upper end of the shaft 68 is a miter gear 69 in mesh with a similar gear 70 on a horizontal feed shaft 71, keyed to which is a pinion 72 in mesh with a pinion 73 on a feed screw 74 which passes through a nut 75 mounted on the turret 41.

It is, of course, desirable to have the work table slide feed only when work is being performed by the milling tool, and it is also desirable to have the feed in either direction lengthwise of the slide. I provide for this by providing two miter gears 70 on diametrically opposite sides of the miter gear 69, both of which are loose on the feed shaft 71, and between which is slidably mounted a double clutch collar 77 adapted to occupy a mid position where it clutches neither miter gear 70 to the shaft 71 or to be moved into clutch engagement with either to connect with the shaft 71. For moving the clutch collar 77 of each work table, it is connected to a rock shaft 78 having a crank arm 79 that is connected by a sliding rod 80, which in turn is connected to a rock shaft 81 having at one side of the work table an operating crank 82 by means of which the rock shaft 78 may be moved to place the clutch collar in the desired position, either for feeding the work table slide in either direction or depriving it of feeding power. A spring pressed latch 83 is provided to yieldingly engage any one of the three notches in the hub of the crank arm 79, and thereby latch the clutch collar in each of its three positions. Preferably the operating shaft 81 is placed obliquely, or at an angle, as is clearly shown in Fig. 2, so as to avoid any undue projection from the turret which will require unnecessary cutting away of the spindle housing to provide the necessary clearance for the revolution of the turret with the work tables. To compensate for the cutting away of the spindle housing on the side toward the turret, the housing where the bearing is provided for the outer end of the spindle is projected, so as to give the desired overhang of the tool carrying end of the spindle over the work table, all as may be seen from Figs. 1 and 2.

To enable the work tables to be moved by hand, each feed shaft has one end projected beyond the work table and provided with an operating handle 83. To automatically stop the feed of each table, the crank arm 79, forming a part of the clutch-operating mechanism in each case, is provided with a laterally projecting pin 790 in the path of an adjustable dog 791 on the near side of the work table, which dog by the feed of the table is brought into contact with the pin 790 and thereby the clutch 77 shifted to neutral position to stop the feed.

It will be seen that by the provision of the multiple tables upon a turret or revolving support, economy of time is secured, since while work is being done upon one table the workman can be setting up work on another table; by the continued revolution of the turret it is possible to mill ring-form or circular shapes; and as the work after being completed is carried by the revolution of the turret away from the tool, the danger of scratching and marring the finished work, as well as danger of harm to the workman, is avoided, which exists when the work must be drawn beneath the tool after completion. As shown in Figs. 5 and 6, boring can be done since the turret can be revolved to place the work table so that its travel will be in a direction parallel with the longitudinal axis of the spindle, and the boring bar 85 supported by the spindle at one end may be supported at the other end by a bearing 86 in a bracket 87 clamped to the top of the work table, the bearing 86 being vertically adjustable in the bracket. If desired the bearing bracket 87 may be quickly shifted from one work table to the other. Again the work tables can be set at any angle desired, since they may be revolved through a full circle and thus, for example, holes in brackets and other articles can be bored at any angle to each other with one setting of the work, simply by swinging the table to the various angles required, and instead of feeding the work feeding the spindle by traversing the spindle-carrying housing.

As shown in Fig. 8, my invention may be embodied in a vertical spindle milling machine as well as in a horizontal spindle milling machine, the only change required being in regard to the matter of gearing for driving the spindle driving worm shaft 320 which in the vertical spindle machine occupies a horizontal position. As is shown in Fig. 8, the clutch for the belt pulley 11 is under the control of a hand lever 88, which is situated convenient to the workman and which is connected by a rod 89 with the shipper lever 90 of the clutch collar 91.

My multiple table arrangement is also useful in case it is desired to perform a roughing as well as a finishing cut in the one machine by a single setting of the work, it being necessary merely to duplicate the cutter spindles as indicated in Fig. 8 so that there will be a cutter spindle for each work table, the roughing cut being first made by one spindle and the table then revolved to place it in position for the finishing cut by the tool of the other spindle.

Having thus described my invention what I claim is—

1. In a milling machine, the combination of a tool spindle, multiple work tables, a common support for the work tables movable with reference to the spindle to place the tables successively in working relation with the spindle tool and means to reciprocate the tables transversely of the spindle.

2. In a milling machine, the combination of a tool spindle, multiple work tables, a common support for the work tables rotatable with reference to the spindle to place the tables successively in working relation with the spindle tool table feeding means, and a driving shaft for the latter concentric with the axis of the rotation of the table support.

3. In a milling machine, the combination of a tool spindle, a plurality of work tables, a common movable support for said tables by the movement of which the tables are shifted in succession into working relation with the tool spindle, and a feed mechanism for each of said work tables.

4. In a milling machine, the combination of a tool spindle, multiple work tables, a common support for the work tables rotatable with reference to the spindle to place the tables successively in working relation with the spindle tool, and a feed mechanism for each work table.

5. In a milling machine, the combination of a tool spindle, a plurality of work tables, a common movable support for said tables by the movement of which the tables are shifted in succession into working relation with the tool spindle, a feed mechanism for each of said work tables, and means to control each feed mechanism independently of the other.

6. In a milling machine, the combination of a tool spindle, a turret having a vertical axis, a pair of work tables slidably mounted parallel with each other on the turret, and a feed mechanism for each work table.

7. In a milling machine, the combination of a tool spindle, a turret having a vertical axis, a pair of work tables slidably mounted parallel with each other on the turret, a feed mechanism for each work table, a shaft having an operative connection with said feed mechanisms, means to control each feed mechanism independently of the other, and the turret revolving mechanism operatively connected with said shaft.

8. In a milling machine, the combination of a tool spindle, multiple tables, a common traveling support for said tables, feed mechanism for each table, a driving shaft, gearing between the latter and the spindle, including change gears, and gearing between the driving shaft and the table support and table feeding means, including change gears.

9. In a milling machine, the combination of a tool spindle, multiple work tables, a common support for the work tables rotatable with reference to the spindle to place the tables successively in working relation with the spindle tool, a locking device, a constantly running clutch member, a lever and operative connections between the lever and said locking device and said clutch member.

10. In a milling machine, the combination of a tool spindle, multiple work tables, a common support for the work tables rotatable with reference to the spindle to place the tables successively in working relation with the spindle tool, a gear wheel concentric with the axis of rotation of said support, a feed device for each table, geared to said gear wheel, a clutch member slidably and rotatably connected with said gear wheel, and means to engage said clutch member with said rotatable support.

In testimony that I claim the foregoing I have hereunto set my hand.

JAMES CHARLES POTTER.

Witnesses:
ELVERY LINGARD,
EARL H. ROBERTS.

---

Copies of this patent may be obtained for five cents each, by addressing the "Commissioner of Patents, Washington, D. C."